United States Patent
Opushnyev

(10) Patent No.: US 12,430,631 B2
(45) Date of Patent: Sep. 30, 2025

(54) PROTECTING SENSITIVE DATA IN INTERNET-OF-THINGS (IoT) DEVICE

(71) Applicant: MASTERCARD TECHNOLOGIES CANADA ULC, Vancouver (CA)

(72) Inventor: Igor Opushnyev, New Westminster (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 259 days.

(21) Appl. No.: 17/559,720

(22) Filed: Dec. 22, 2021

(65) Prior Publication Data

US 2023/0198966 A1    Jun. 22, 2023

(51) Int. Cl.
| | |
|---|---|
| G06Q 20/30 | (2012.01) |
| G06F 21/60 | (2013.01) |
| G06Q 20/40 | (2012.01) |
| G16Y 30/10 | (2020.01) |
| H04L 9/08 | (2006.01) |
| H04L 9/40 | (2022.01) |

(52) U.S. Cl.
CPC ......... G06Q 20/308 (2020.05); G06F 21/602 (2013.01); G06Q 20/401 (2013.01); G16Y 30/10 (2020.01); H04L 9/085 (2013.01); H04L 9/0872 (2013.01); H04L 9/0894 (2013.01); H04L 63/0435 (2013.01); *G06Q 2220/00* (2013.01)

(58) Field of Classification Search
CPC ... H04L 63/0435; H04L 9/085; H04L 9/0872; H04L 9/0894; H04L 9/08; G06F 21/602; G06Q 20/308; G06Q 20/401; G06Q 2220/00

See application file for complete search history.

(56) References Cited

U.S. PATENT DOCUMENTS

| | | | | |
|---|---|---|---|---|
| 7,177,426 | B1* | 2/2007 | Dube | G06F 21/6209 380/46 |
| 7,188,176 | B1* | 3/2007 | Nedderman | H04L 65/1069 709/227 |
| 9,703,979 | B1* | 7/2017 | Yang | H04L 9/12 |
| 9,832,601 | B1* | 11/2017 | Vaughn | H04L 63/102 |

(Continued)

OTHER PUBLICATIONS

Wikipedia—Function (computer programming).*
International Search Report and Written Opinion for Application No. PCT/CA2022/051788 dated Mar. 20, 2023 (9 pages).

*Primary Examiner* — Steven S Kim
(74) *Attorney, Agent, or Firm* — Michael Best & Friedrich LLP

(57) ABSTRACT

Protecting sensitive data in an internet-of-things (IoT) device. In one embodiment, a computing device includes network communications, a memory, and an electronic processor communicatively coupled to the memory and the network communications. The electronic processor is configured to receive a transaction setup request, determine, with the network communications, whether minimally required network environment attributes are available, prompt a user that sensitive data can be securely stored in the memory and to enter the sensitive data in response to determining that the minimally required network environment attributes are available, and prompt the user that the sensitive data cannot be securely stored in the memory in response to determining that the minimally required network environment attributes are not available.

20 Claims, 9 Drawing Sheets

(56) References Cited

U.S. PATENT DOCUMENTS

| | | | |
|---|---|---|---|
| 10,193,690 B1* | 1/2019 | Self | H04L 9/0894 |
| 11,196,558 B1* | 12/2021 | Mare | H04L 9/0863 |
| 11,295,308 B1* | 4/2022 | Fortney | G06Q 20/4012 |
| 2002/0069359 A1* | 6/2002 | Watanabe | G11B 20/00086 |
| | | | 713/176 |
| 2003/0142669 A1* | 7/2003 | Kubota | H04L 45/50 |
| | | | 370/469 |
| 2004/0158707 A1* | 8/2004 | Kim | H04L 63/0435 |
| | | | 713/153 |
| 2007/0124578 A1* | 5/2007 | Paya | H04L 51/00 |
| | | | 713/168 |
| 2007/0133547 A1* | 6/2007 | Ko | H04L 47/18 |
| | | | 370/392 |
| 2010/0023449 A1* | 1/2010 | Skowronek | G06Q 20/3263 |
| | | | 705/39 |
| 2010/0037327 A1* | 2/2010 | Nakajima | G06F 21/31 |
| | | | 380/278 |
| 2012/0193434 A1* | 8/2012 | Grigg | G06Q 20/3572 |
| | | | 235/492 |
| 2014/0287679 A1* | 9/2014 | Lim | H04L 9/0872 |
| | | | 455/12.1 |
| 2014/0337175 A1* | 11/2014 | Katzin | G06Q 20/326 |
| | | | 705/26.62 |
| 2016/0034693 A1* | 2/2016 | Takeuchi | G06F 21/604 |
| | | | 713/189 |
| 2016/0197949 A1* | 7/2016 | Nyhuis | H04L 63/1416 |
| | | | 713/190 |
| 2016/0239686 A1* | 8/2016 | Kwon | G06F 21/602 |
| 2016/0358199 A1* | 12/2016 | Van Os | G06Q 20/40 |
| 2017/0093824 A1* | 3/2017 | Shulman | H04L 63/1433 |
| 2017/0346851 A1* | 11/2017 | Drake | H04L 9/0838 |
| 2017/0359352 A1* | 12/2017 | Ainscow | H04L 63/102 |
| 2018/0232734 A1* | 8/2018 | Smets | G06Q 20/40 |
| 2019/0109816 A1 | 4/2019 | Liu et al. | |
| 2020/0195433 A1 | 6/2020 | Collier et al. | |
| 2020/0356992 A1* | 11/2020 | Quigley | G06Q 20/34 |
| 2020/0412733 A1 | 12/2020 | Leon et al. | |

\* cited by examiner

PROTECTING SENSITIVE DATA IN INTERNET-OF-THINGS (IoT) DEVICE

FIELD OF THE INVENTION

The present disclosure relates generally to data encryption. More specifically, the present disclosure relates to protection of sensitive data in an internet-of-things (IoT) device.

BACKGROUND

IoT devices are the non-standard computing devices that connect wirelessly (or via Ethernet or other wired connection) to a local network. The IoT devices transmit data and may perform actions on behalf of a user. The actions may include ordering supplies or products by initiating a card owner not present transaction using payment information stored on the IoT device.

SUMMARY

According to the Open Web Application Security Project (OWASP), many IoT devices are vulnerable to various cyber-attacks. Sensitive data on IoT devices cannot be stored in an open form due to the vulnerabilities. A conventional solution to address these vulnerabilities is to protect data with a user provided password or a user provided key. To perform an action on behalf of a user, a device must first receive the previously set password or key to unlock the necessary sensitive information required for the requested action.

For an IoT device to act on behalf of a user, the IoT device must be able to derive a key to unlock the data required for performing the requested action from an external source without the user's involvement. In embodiments, IoT devices of the present disclosure derive a secret key from network environment attributes detected by the IoT devices to encrypt/decrypt the data required for performing the requested action without the user's involvement aside from initially providing the data. By encrypting/decrypting the data with a secret key, IoT devices of the present disclosure protect sensitive data and significantly reduce or eliminate vulnerabilities during a cyber-attack. Additionally, IoT devices of the present disclosure prevent a user from storing sensitive data on an IoT device when the network environment of the IoT devices does not allow for derivation of the secret key. By prompting a user, the IoT devices of the present disclosure prevent sensitive data being stored without encryption and further reduce or eliminate vulnerabilities during a cyber-attack. In view of the foregoing, the IoT devices of the present disclosure are faster, more efficient, and more secure because the IoT devices of the present disclosure prevent a user from storing sensitive data without encryption, allow a user to store sensitive data with encryption based on network environment attributes of the IoT devices, and perform requested actions without requiring any interaction by a user.

One embodiment described herein is a computing device including network communications, a memory, and an electronic processor communicatively coupled to the memory and the network communications. The electronic processor is configured to receive a transaction setup request, determine, with the network communications, whether minimally required network environment attributes are available, prompt a user that sensitive data can be securely stored in the memory and to enter the sensitive data in response to determining that the minimally required network environment attributes are available, and prompt the user that the sensitive data cannot be securely stored in the memory in response to determining that the minimally required network environment attributes are not available.

Another embodiment described herein is a method. The method includes receiving, with an electronic processor of a computing device, a transaction setup request. The method includes determining, with the electronic processor, whether minimally required network environment attributes are available from network communications of the computing device. The method includes prompting, with the electronic processor, a user that sensitive data can be securely stored in a memory and to enter the sensitive data in response to determining that the minimally required network environment attributes are available. The method also includes prompting, with the electronic processor, the user that the sensitive data cannot be securely stored in the memory in response to determining that the minimally required network environment attributes are not available.

Yet another embodiment described herein is a non-transitory computer-readable medium comprising instructions that, when executed by an electronic processor, cause the electronic processor to perform a set of operations. The set of operations includes receiving a transaction setup request. The set of operations determining whether minimally required network environment attributes are available from network communications. The set of operations includes prompting a user that sensitive data can be securely stored in a memory and to enter the sensitive data in response to determining that the minimally required network environment attributes are available. The set of operations also includes prompting the user that the sensitive data cannot be securely stored in the memory in response to determining that the minimally required network environment attributes are not available.

Other aspects of the embodiments will become apparent by consideration of the detailed description and accompanying drawings.

DETAILED DESCRIPTION

Figure 1:
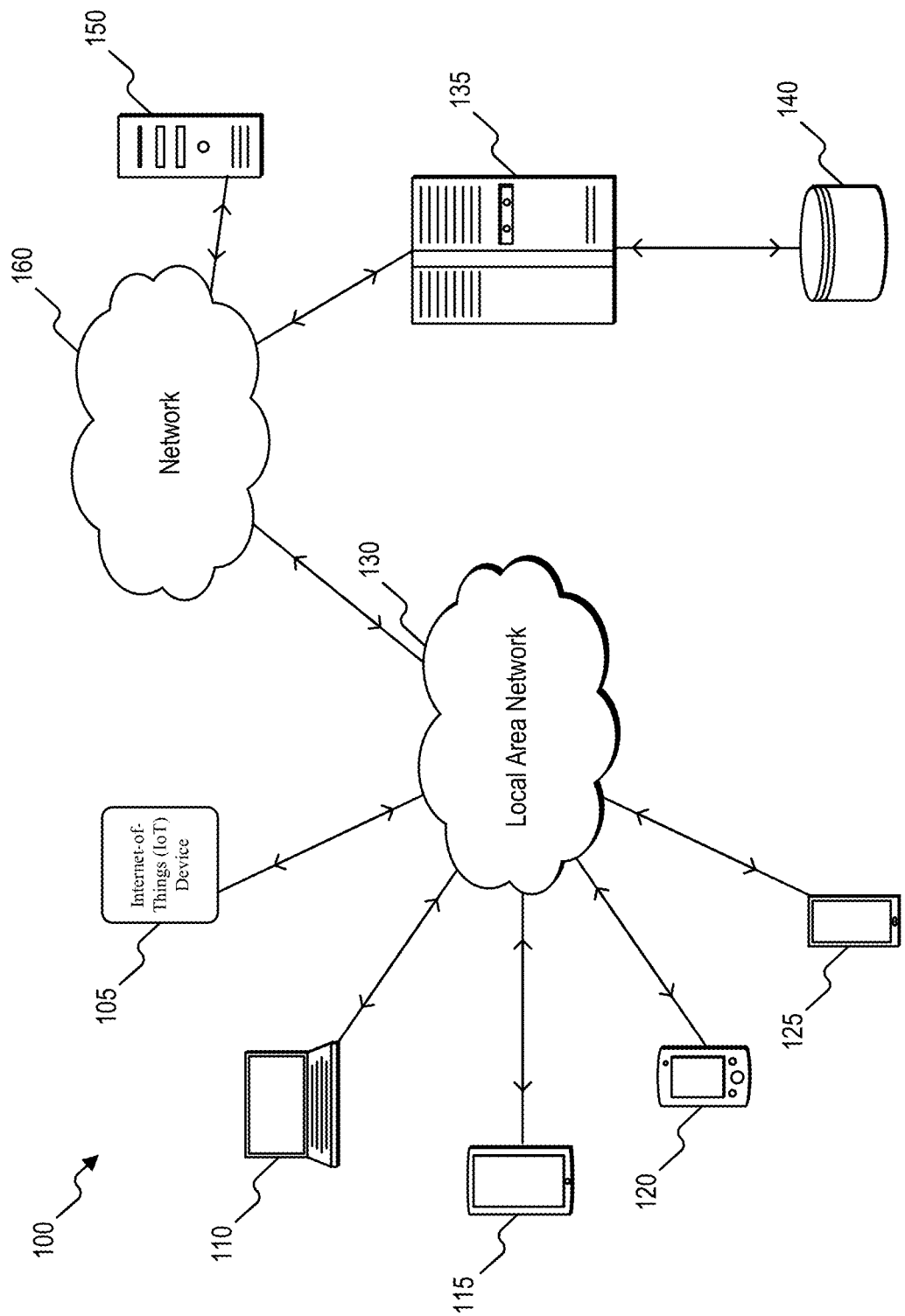
FIG. 1 is a diagram that illustrates a system including an IoT device, according to embodiments described herein.

FIG. 1 is a diagram that illustrates a system 100 including an IoT device, according to embodiments described herein. The system 100 includes a plurality of user devices 105-125, a local area network 130, a server 135, a database 140, a client server 150, and the Internet 160. The plurality of user devices 105-125 include, for example, an internet-of-things (IoT) device 105, a laptop computer 110, a tablet computer 115, a personal digital assistant ("PDA") (e.g., an iPod touch, an e-reader, etc.) 120, and a mobile phone (e.g., a smart phone) 125. The IoT device 105 (also referred to as a "computing device") is configured to detect attributes or values for attributes of the user devices 110-125. Device attributes of the user devices 110-125 may include, for example, user agent, operating system, location, time of day, mouse location, or other suitable device attribute information regarding the user device. Device attribute information received from the user devices 110-125 at the IoT device 105 may be stored by the IoT device 105.

The network 130 is, for example, a local area network ("LAN") employing any of a variety of communications protocols, such as Wi-Fi, Bluetooth, ZigBee, etc. The client server 150 is a server of a resource provider. For example, the client server 150 is a merchant server that provides access to a product or service to a user. However, any server-side resource may be considered in place of the "product or service."

The network 160 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 160 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a Digital Enhanced Cordless Telecommunications ("DECT") network, a Digital AMPS ("IS-136/TDMA") network, or an Integrated Digital Enhanced Network ("iDEN") network, etc.

The connections between the user devices 110-125 and the network 130 are, for example, wired connections, wireless connections, or a combination of wireless and wired connections. The connection between the server 135 and the merchant server 150 and the network 160 are, for example, wired connections, wireless connections, or a combination of wireless and wired connections.

Figure 2:
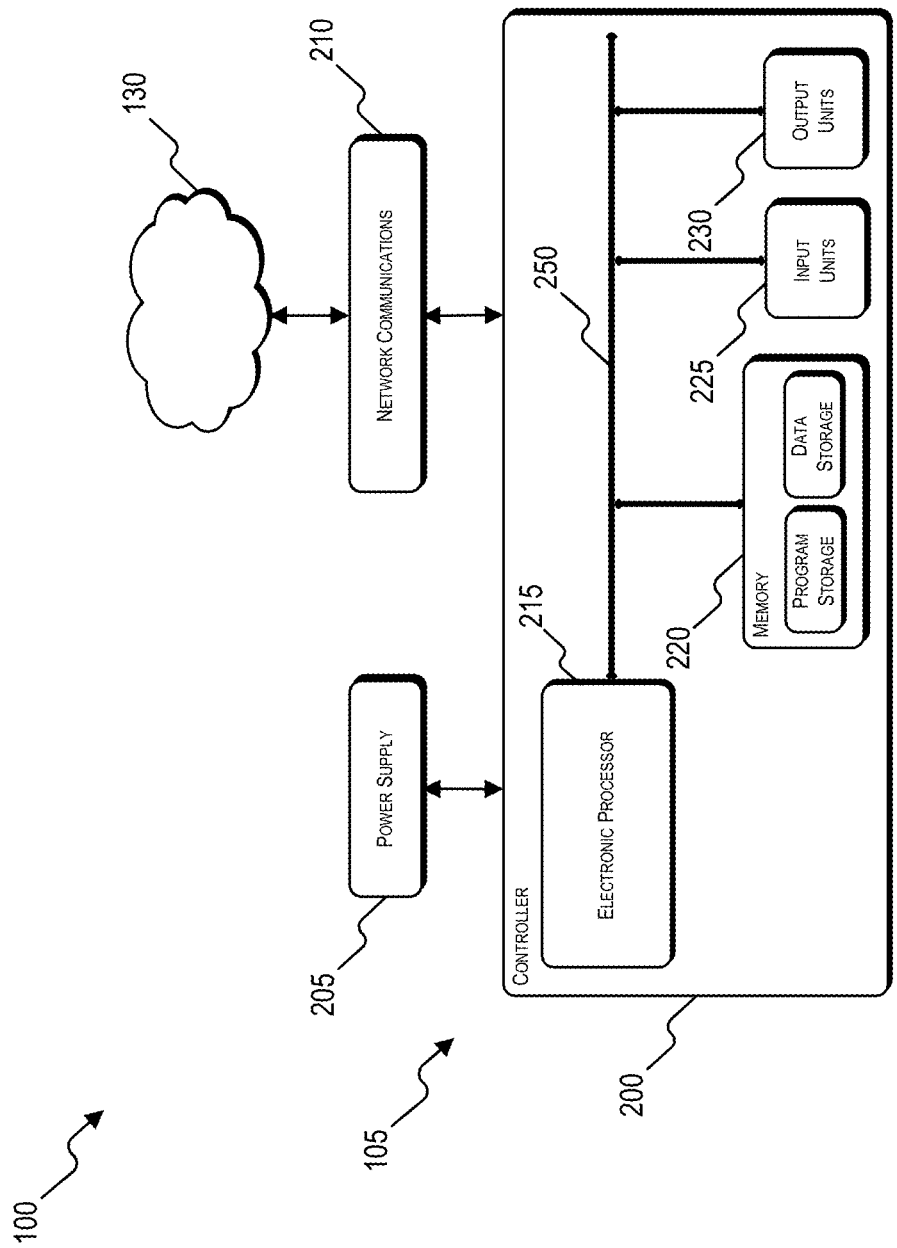
FIG. 2 is a block diagram that illustrates a first example of the IoT device of the system of FIG. 1, according to embodiments described herein.

FIG. 2 is a block diagram that illustrates a first example 200 of the IoT device 105 of the system 100 of FIG. 1, according to embodiments described herein. The IoT device 105 is electrically and/or communicatively connected to a variety of modules or components of the system 100. The IoT device 105 includes a controller 200, a power supply module 205, and a network communications module 210. The controller 200 includes combinations of hardware and software that are configured to, for example, evaluate the device attributes of the devices 110-125. For example, the IoT device 105 may evaluate the device attributes of the devices 110-125 while the IoT device 105 attempts to store sensitive data or access a server-side resource. The controller 200 includes a plurality of electrical and electronic components that provide power, operational control, and protection to the components and modules within the controller 200 and/or the system 100. For example, the controller 200 includes, among other things, an electronic processor 215 (e.g., a microprocessor, a microcontroller, or other suitable processing device), a memory 220, input units 225, and output units 230. The electronic processor 215, the memory 220, the input units 225, and the output units 230, as well as the various modules connected to the controller 200 are connected by one or more control and/or data buses (e.g., common bus 250). The control and/or data buses are shown schematically in FIG. 2 for illustrative purposes.

The memory 220 is a non-transitory computer-readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. In some examples, the program storage area may store the instructions regarding the protection of sensitive data as described in greater detail below.

The electronic processor 215 executes machine-readable instructions stored in the memory 220. For example, the electronic processor 215 may execute instructions stored in the memory 220 to perform the functionality of the IoT device 105 as described below.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. Software included in the implementation of the system 100 can be stored in the memory 220 of the controller 200. The software includes, for example, firmware, one or more applications, program data, filters, rules, one or more program modules, and other executable instructions. The controller 200 is configured to retrieve from memory and execute, among other things, instructions related to the IoT device 105 described herein.

The power supply module 205 supplies a nominal AC or DC voltage to the controller 200 or other components or modules of the system 100. The power supply module 205 is powered by, for example, mains power having nominal line voltages between 100V and 240V AC and frequencies of approximately 50-60 Hz. The power supply module 205 is also configured to supply lower voltages to operate circuits and components within the controller 200 or system 100.

The IoT device 105 evaluates the attributes of other user devices on the same network. The following categories are an illustrative subset of network environment categories that may be detected by the IoT device 105: 1) subnet, 2) local area network characteristics, 3) connected Wi-Fi parameters, 4) paired Bluetooth® devices, 5) advertising Bluetooth® devices, 6) advertising Wi-Fi access points, and 7) personal area network. However, the present disclosure is not limited to these network environment categories or the attributes listed below. The present disclosure may include other suitable network environment categories and/or other suitable network environment attributes.

The subnet category includes several network environment attributes, for example, device name, internet protocol (IP) address, model, brand, and family. The local area network characteristics category includes several network environment attributes, for example, netmask, gateway, and domain name system (DNS). The connected Wi-Fi parameters category includes several network environment attributes, for example, internet service provider (ISP) name, public IP address, location, and time zone. The paired Bluetooth® devices category includes several network environment attributes, for example, manufacturer, device name, model, signal straight received signal strength indication (RSSI), approximated distance based on RSSI, and connection status. The advertising Bluetooth® devices category includes several network environment attributes, for example, identifier (ID), manufacturer, device name, model, signal straight received signal strength indication (RSSI), and approximated distance based on RSSI. The advertising Wi-Fi access points category includes several network environment attributes, for example, service set identifier (SSID), basic service set identifier (BSSID), mode, channel, rate, signal strength, and support security protocols. The personal area network category includes several network environment attributes, for example, device ID, device type, manufacturer, product name, and model number.

Figure 3:
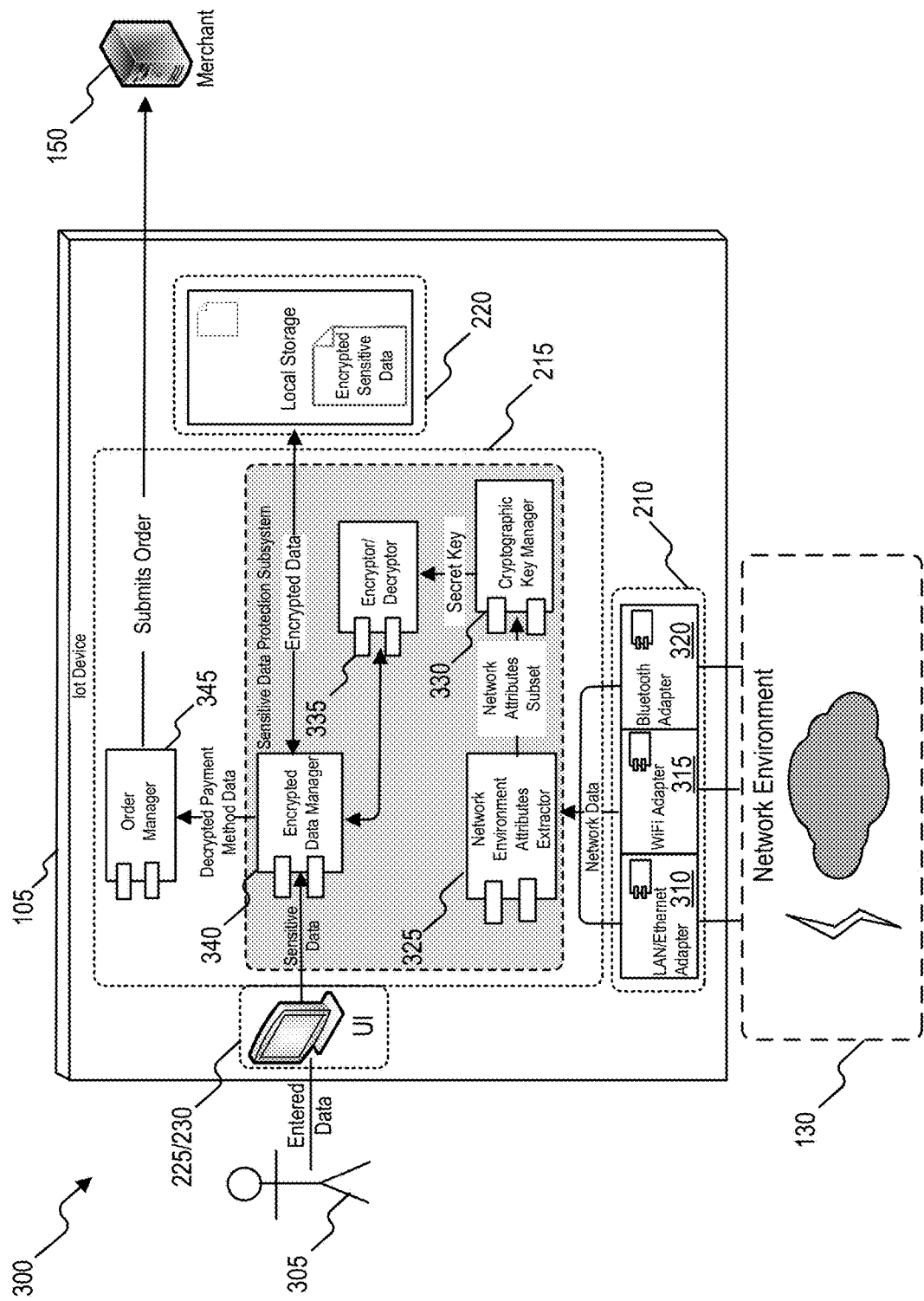
FIG. 3 is a block diagram that illustrates a second example of the IoT device of the system of FIG. 1, according to embodiments described herein.

FIG. 3 is a block diagram that illustrates a second example 300 of the IoT device 105 of the system of FIG. 1, according to embodiments described herein. As illustrated in FIG. 3, the IoT device 105 includes the network communications 210, the electronic processor 215 (e.g., a microprocessor, a microcontroller, or other suitable processing device), the memory 220, and the input units 225. Specifically, the network communications 210 may include at least one of a Local Area Network (LAN)/Ethernet adapter 310, a Wi-Fi adapter 315, a Bluetooth® adapter 320, or other suitable network adapter (e.g., Zigbee, etc.). The network communications 210 is a communication interface that interfaces with the network 130.

The electronic processor 215 performs several different operations including network environment attribute extractor 325, a cryptographic key manager 330, an encryptor/decryptor 335, an encrypted data manager 340, an order manager 345. These different operations have corresponding program instructions stored in the memory 220.

In performing the network environment attribute extractor 325, the electronic processor 215 receives network data from the at least one of the LAN/Ethernet adapter 310, the Wi-Fi adapter 315, the Bluetooth® adapter 320, or the other suitable network adapter (e.g., Zigbee, etc.). The electronic processor 215 generates a network attributes subset based on the network data that is received.

In performing the cryptographic key manager 330, the electronic processor 215 receives the network attributes subset. The electronic processor 215 generates a secret key based on the network attributes subset.

In performing the encryptor/decryptor 335, the electronic processor 215 receives the secret key. The electronic processor 215 encrypts unencrypted data or decrypts encrypted data based on the secret key.

In performing the encrypted data manager 340, the electronic processor 215 receives sensitive data (e.g., payment information) from a user 305 via one of the input units 225 (for example, user inputs via presence-sensitive display) and outputs the sensitive data to the encryptor/decryptor 335. In response to outputting the sensitive data to the encryptor/decryptor 335, the encrypted data manager 340 receives encrypted data from the encryptor/decryptor 335 that is the sensitive data encrypted with the secret key. The encrypted data manager 340 stores the encrypted data in the memory 220.

In performing the order manager 345, the electronic processor 215 receives decrypted payment information from the encrypted data manager 340. After receiving the decrypted payment information, the encrypted data manager 340 submits an order to the merchant server 150. As illustrated in FIG. 3, the order submission from the IoT device 105 to the merchant server 150 is a direct submission for ease of understanding. However, the order submission is via the local network 130 and the network 150 as illustrated in FIG. 1.

Figure 4:
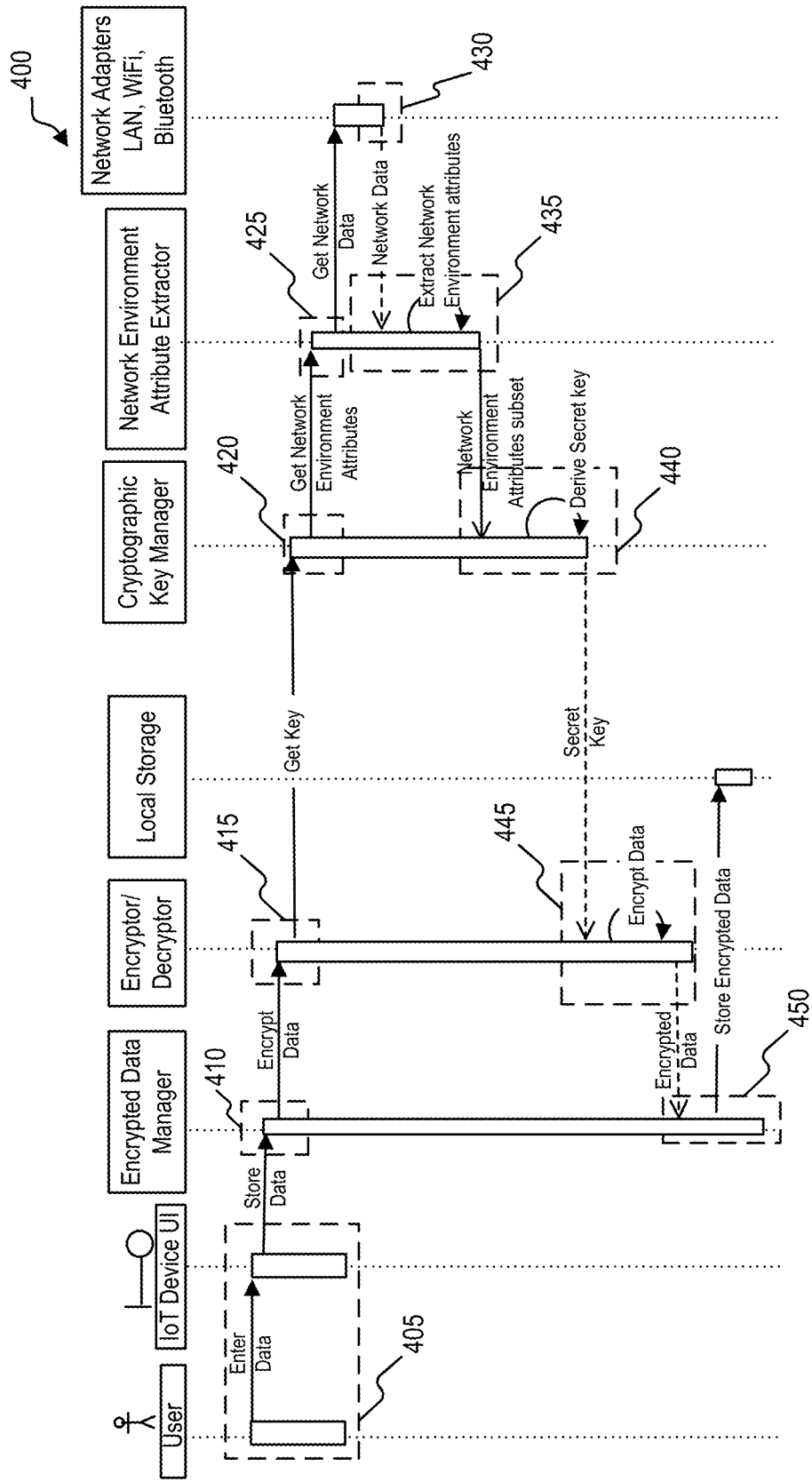
FIG. 4 is a sequence diagram that illustrates a process for storing sensitive data to the IoT device, according to embodiments described herein.

FIG. 4 is a sequence diagram that illustrates a process 400 for storing sensitive data to the IoT device, according to embodiments described herein. FIG. 4 is described with respect to the components of FIG. 3. As illustrated in FIG. 4, the user 305 initiates transaction setup with a request via the input units 225. In response to receiving the transaction setup request from the user 305, the IoT device 105 checks the network environment (e.g., the local area network 130) for availability of minimally required network environment attributes.

The minimally required network environment attributes is the minimum number of network environment attributes from which a strong cryptographic key may be reliability derived. The minimum number depends on the cryptographic algorithm that is used and the required encryption strength. Examples of network environment attributes that may be used for cryptographic key derivation include: Device on the same subnet—4 attributes: 1) Device name, 2) Model, 3) Brand, and 4) Family; Local Area Network—3 attributes: 1) Netmask, 2) Gateway, and DNS; Connected Wi-Fi—4 attributes: 1) ISP name, 2) Public IP Address, 3) Location, and 4) Time zone; and Accessible Wi-Fi point—6 attributes: 1) SSID, 2) BSSID, 3) Mode, 4) Channel, 5) Rate, and 6) Supported security protocols.

Assuming, as a first example, the minimum number is 16, the IoT device is equipped with ethernet adapter only, and there are two other computing devices on the same subnet, the total number of available network environment attributes is LAN (3 attributes)+2*(Device on the same subnet (4 attributes)), which equals 11 attributes. The available 11 attributes are less than the minimum number and the data protection method described herein cannot be used in this first example.

Assuming, as a second example, the minimum number is 16, the IoT device is equipped with Wi-Fi adapter, and the IoT device is connected to a Wi-Fi network with two more Wi-Fi access points available, the total number of available network environment attributes is Connected Wi-Fi (4 attributes)+2*(Accessible Wi-Fi point (6 attributes)), which is 16 attributes. The available 16 attributes are not less than the minimum number and the data protection method described herein may be used in this second example.

Assuming, as a third example, the minimum number is 16, the IoT device equipped with Wi-Fi and Ethernet adapters, the IoT device is connected to LAN and a Wi-Fi network, there are two more Wi-Fi access points available, and there are no other devices on the same subnet, the total number of available network environment attributes is Connected Wi-Fi (4 attributes)+2*(Accessible Wi-Fi point (6 attributes))+LAN (3 attributes), which is 19 attributes. The available 19 attributes are not less than the minimum number and the data protection method described herein may be used in this third example.

When the minimally required network environment attributes are available, the IoT device 105 prompts the user 305 with the output units 230 to enter data via the input units 225 (e.g., credit card information, account access token information, or other suitable payment information) (at block 405). The encrypted data manager 340 encrypts the entered data with the encryptor/decryptor 335 (at block 410). Before encrypting the data, the encryptor/decryptor 335 requests a key for encrypting the entered data from the cryptographic key manager 330 (at block 415). The cryptographic key manager 330 requests network environment attributes from the network environment attribute extractor 325 (at block 420). The network environment attribute extractor 325 requests network data from the network communications 210 (at block 425). The network communications 210 output network data to the network environment attribute extractor 325 (at block 430).

The network environment attribute extractor 325 receives network data from the network communications 210, determines network environment attributes subset from the network data, and outputs the network environment attributes subset to the cryptographic key manager 330 (at block 435). The cryptographic key manager 330 receives the network environment attributes subset from the network environment attribute extractor 325, derives a secret key from the network environment attributes subset sent from the network environment attribute extractor 325, and outputs the secret key to the encryptor/decryptor 335 (at block 440).

Upon receiving the secret key, the encryptor/decryptor 335 encrypts the entered data to generate encrypted data and outputs the encrypted data to the encrypted data manager 340 (at block 445). The encryptor/decryptor 335 erases the secret key immediately after completing the encryption process.

The encrypted data manager 340 receives the encrypted data and stores the encrypted data in the memory 220 (at block 450). The encrypted data manager 340 erases the entered data immediately after completing the storage process. The encrypted data manager 340 also shows the user 305 a "success" message with the output units 235.

When the minimally required network environment attributes are not available, the IoT device 105 prompts the user 305 with the output units 230 that sensitive data cannot currently be stored on the IoT device 105. After prompting the user 305, the IoT device 105 aborts the storage process.

Figure 5:
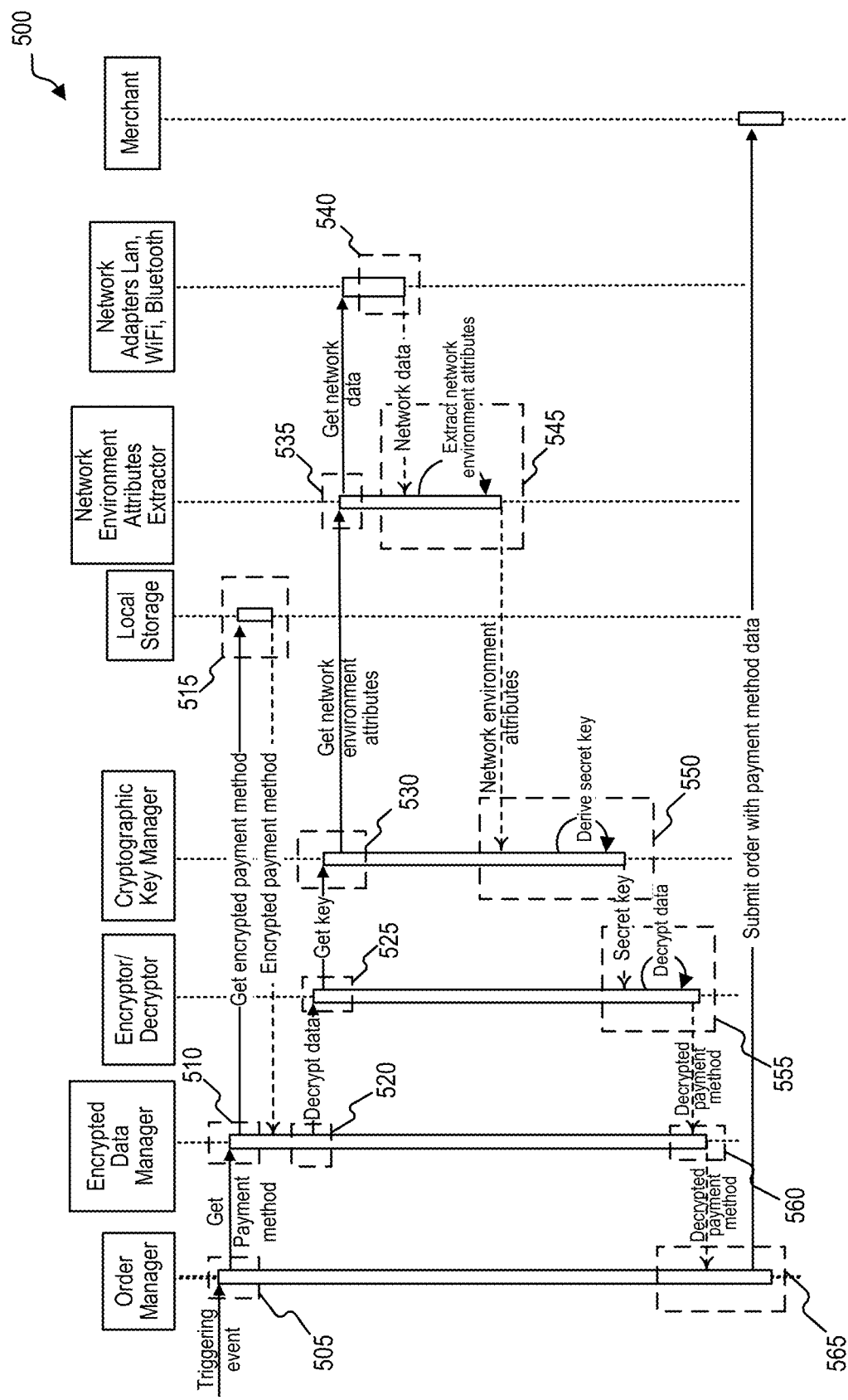
FIG. 5 is a sequence diagram that illustrates a process for performing a cardholder not present transaction, according to embodiments described herein.

FIG. 5 is a sequence diagram that illustrates a process 500 for performing a cardholder not present transaction, according to embodiments described herein. FIG. 5 is described with respect to the components of FIG. 3. As illustrated in FIG. 5, a triggering event in the order manager 345 requests a payment method from the encrypted data manager 340 (at block 505). In response to receiving the payment method request from the order manager 345, the IoT device 105 checks the network environment (e.g., the local area network 130) for availability of minimally required network environment attributes.

When the minimally required network environment attributes are available, the encrypted data manager 340 of the IoT device 105 requests encrypted data that is an encrypted form of the payment method from the memory 220 (at block 510). The memory 220 outputs the encrypted data to the encrypted data manager 340 (at block 515). The encrypted data manager 340 decrypts the encrypted data with the encryptor/decryptor 335 (at block 520). Before decrypting the data, the encryptor/decryptor 335 requests a key for decrypting the encrypted data from the cryptographic key manager 330 (at block 525). The cryptographic key manager 330 requests network environment attributes from the network environment attribute extractor 325 (at block 530). The network environment attribute extractor 325 requests network data from the network communications 210 (at block 535). The network communications 210 output network data to the network environment attribute extractor 325 (at block 540).

The network environment attribute extractor 325 receives network data from the network communications 210, determines network environment attributes subset from the network data, and outputs the network environment attributes subset to the cryptographic key manager 330 (at block 545). The cryptographic key manager 330 receives the network environment attributes subset from the network environment attribute extractor 325, derives a secret key from the network environment attributes subset sent from the network environment attribute extractor 325, and outputs the secret key to the encryptor/decryptor 335 (at block 550).

Upon receiving the secret key, the encryptor/decryptor 335 decrypts the encrypted data to generate a decrypted payment method and outputs the decrypted payment method to the encrypted data manager 340 (at block 555). The encryptor/decryptor 335 erases the secret key immediately after completing the decryption process.

The encrypted data manager 340 outputs the decrypted payment method to the order manager 345 (at block 560). The encrypted data manager 340 erases the decrypted payment method immediately after completing the transmission process.

The order manager 345 receives the decrypted payment method and outputs an order to the merchant server 150 with the decrypted payment method (at block 565). The order manager 345 erases the decrypted payment method immediately after completing the order process.

When the minimally required network environment attributes are not available, the IoT device 105 prompts the user 305 with the output units 230 that an order cannot be placed with the IoT device 105. After prompting the user 305, the IoT device 105 aborts the order process.

Figure 6:
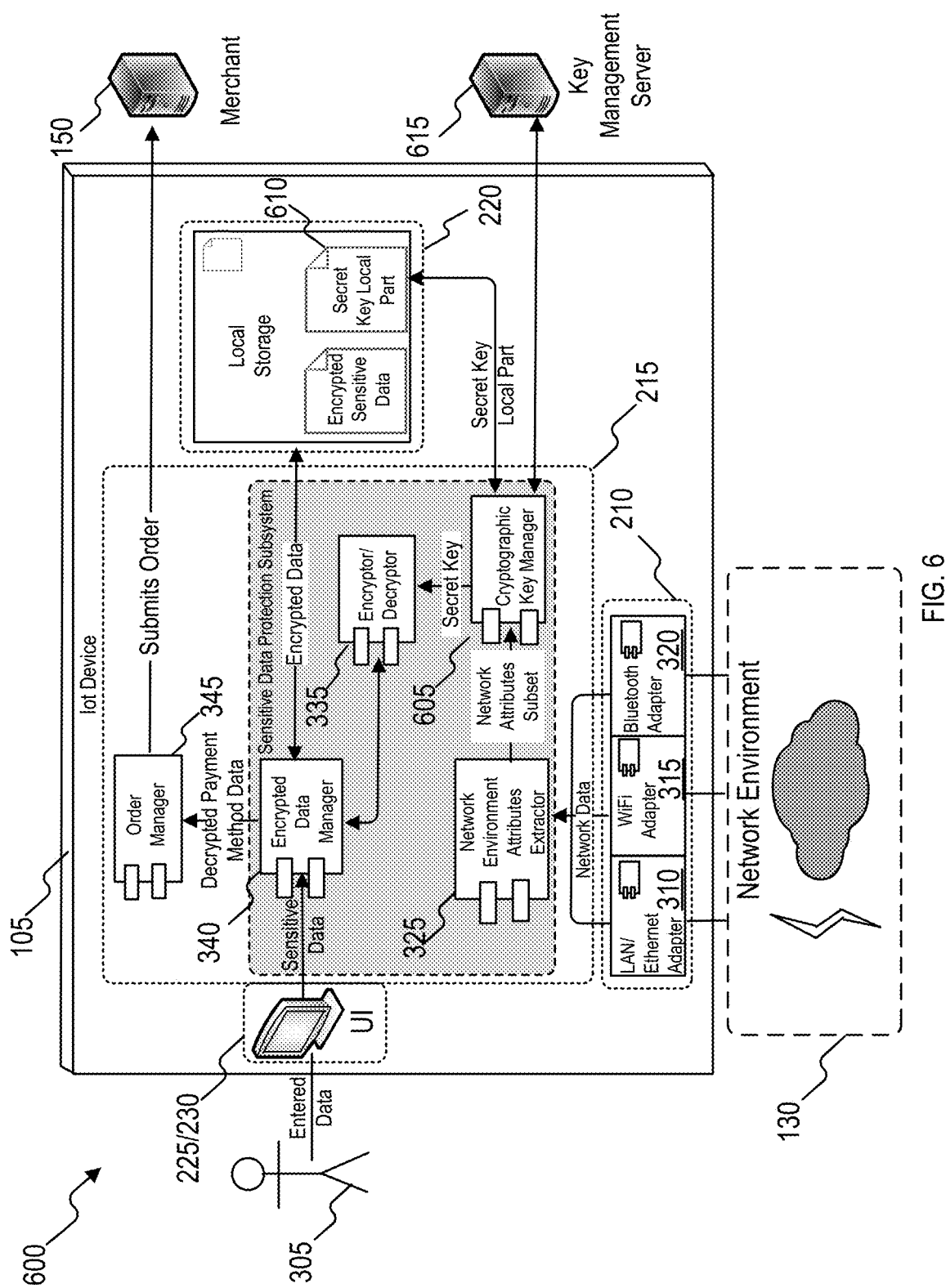
FIG. 6 is a block diagram that illustrates a third example of the IoT device of the system of FIG. 1, according to embodiments described herein.

FIG. 6 is a block diagram that illustrates a third example 600 of the IoT device 105 of the system 100 of FIG. 1, according to embodiments described herein. FIG. 6 is similar to the second example of FIG. 3. Consequently, similarly numbered components are not described a second time to avoid redundancy.

Unlike the second example 300 of FIG. 3, the third example 600 of FIG. 6 includes a cryptographic key manager 605 instead of a cryptographic key manager 330. The cryptographic key manager 605 performs functions similar to the cryptographic key manager 330. In addition, the cryptographic key manager 605 stores the secret key in a remote server, referred to as a key management server 615 (e.g., the server 135) that stores the secret key in a database (e.g., the database 140). Alternatively, the cryptographic key manager 605 splits the secret key into a local part and remote part, where the local part is stored in the memory 220 and the remote part is sent to the key management server 615. Additionally, in some examples, the local part and/or the remote part may also be further encrypted.

In performing the cryptographic key manager 605, the electronic processor 215 queries the key management server 615 for a secret key. In response to receiving no response from the key management server 615, the electronic processor 215 requests the network attributes subset and generates a secret key based on the network attributes subset. In response to receiving a part of or a complete secret key from the key management server 615, in performing the encryptor/decryptor 335, the electronic processor 215 receives the secret key from the cryptographic key manager 605. In some examples, the secret key is decrypted the part of or the complete secret key from the key manager server 615. In performing the encryptor/decryptor 335, the electronic processor 215 encrypts unencrypted data or decrypts encrypted data with the secret key.

Figure 7:
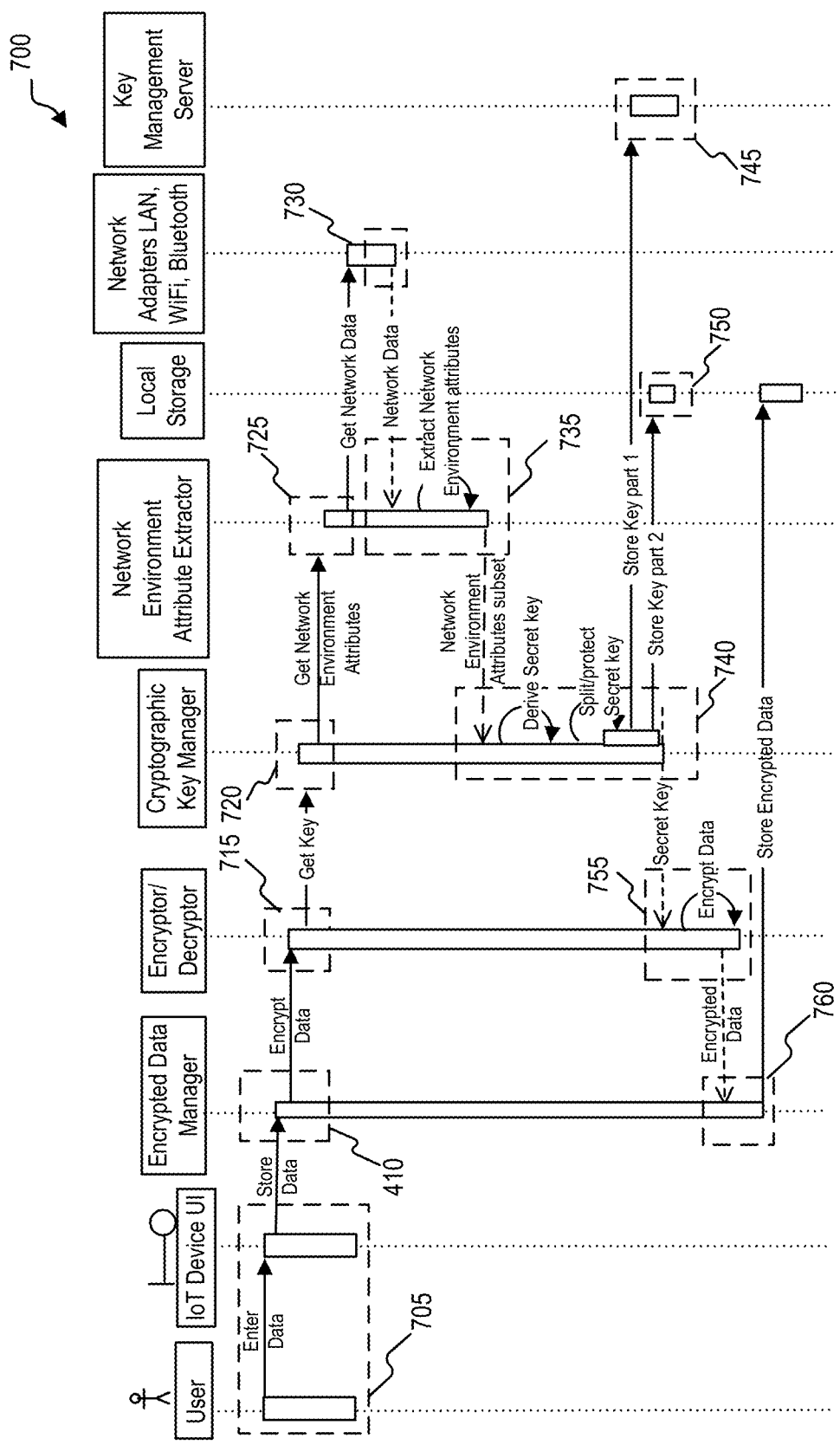
FIG. 7 is a sequence diagram that illustrates a process for storing sensitive data to the IoT device, according to embodiments described herein.

FIG. 7 is a sequence diagram that illustrates a process 700 for storing sensitive data to the IoT device, according to embodiments described herein. FIG. 7 is described with respect to the components of FIG. 6. As illustrated in FIG. 7, the user 305 initiates transaction setup with a request via the input units 225. In response to receiving the transaction setup request from the user 305, the IoT device 105 checks the network environment (e.g., the local area network 130) for availability of minimally required network environment attributes.

When the minimally required network environment attributes are available, the IoT device 105 prompts the user 305 with the output units 230 to enter data via the input units 225 (e.g., credit card information, account access token information, or other suitable payment information) (at block 705). The encrypted data manager 340 encrypts the entered data with the encryptor/decryptor 335 (at block 710). Before encrypting the data, the encryptor/decryptor 335 requests a key for encrypting the entered data from the cryptographic key manager 605 (at block 715). The cryptographic key manager 605 requests network environment attributes from the network environment attribute extractor 325 (at block 720). The network environment attribute extractor 325 requests network data from the network communications 210 (at block 725). The network communications 210 output network data to the network environment attribute extractor 325 (at block 730).

The network environment attribute extractor 325 receives network data from the network communications 210, determines network environment attributes subset from the network data, and outputs the network environment attributes subset to the cryptographic key manager 605 (at block 735). The cryptographic key manager 605 receives the network environment attributes subset from the network environment attribute extractor 325, derives a secret key from the network environment attributes subset sent from the network environment attribute extractor 325, and outputs the secret key to the encryptor/decryptor 335 (at block 740).

Additionally, the cryptographic key manager 605 may split and/or encrypt the secret key and output the secret key (whole or in part, encrypted or unencrypted) to the key management server 615 (at block 745). For example, part of the secret key may be encrypted with the other part of the secret key. When the cryptographic key manager 605 splits the secret key, the cryptographic key manager 605 stores part of the secret key (encrypted or unencrypted) in the memory 220 (at block 750). When the cryptographic key manager 605 splits the secret key, the cryptographic key manager 605 may later retrieve the part of the secret key (encrypted or unencrypted) from the memory 220.

Upon receiving the secret key, the encryptor/decryptor 335 encrypts the entered data to generate encrypted data and outputs the encrypted data to the encrypted data manager 340 (at block 755). The encryptor/decryptor 335 erases the secret key immediately after completing the encryption process.

The encrypted data manager 340 receives the encrypted data and stores the encrypted data in the memory 220 (at block 760). The encrypted data manager 340 erases the entered data immediately after completing the storage process. The encrypted data manager 340 also shows the user 305 a "success" message with the output units 235.

When the minimally required network environment attributes are not available, the IoT device 105 prompts the user 305 with the output units 230 that sensitive data cannot currently be stored on the IoT device 105. After prompting the user 305, the IoT device 105 aborts the storage process.

Figure 8:
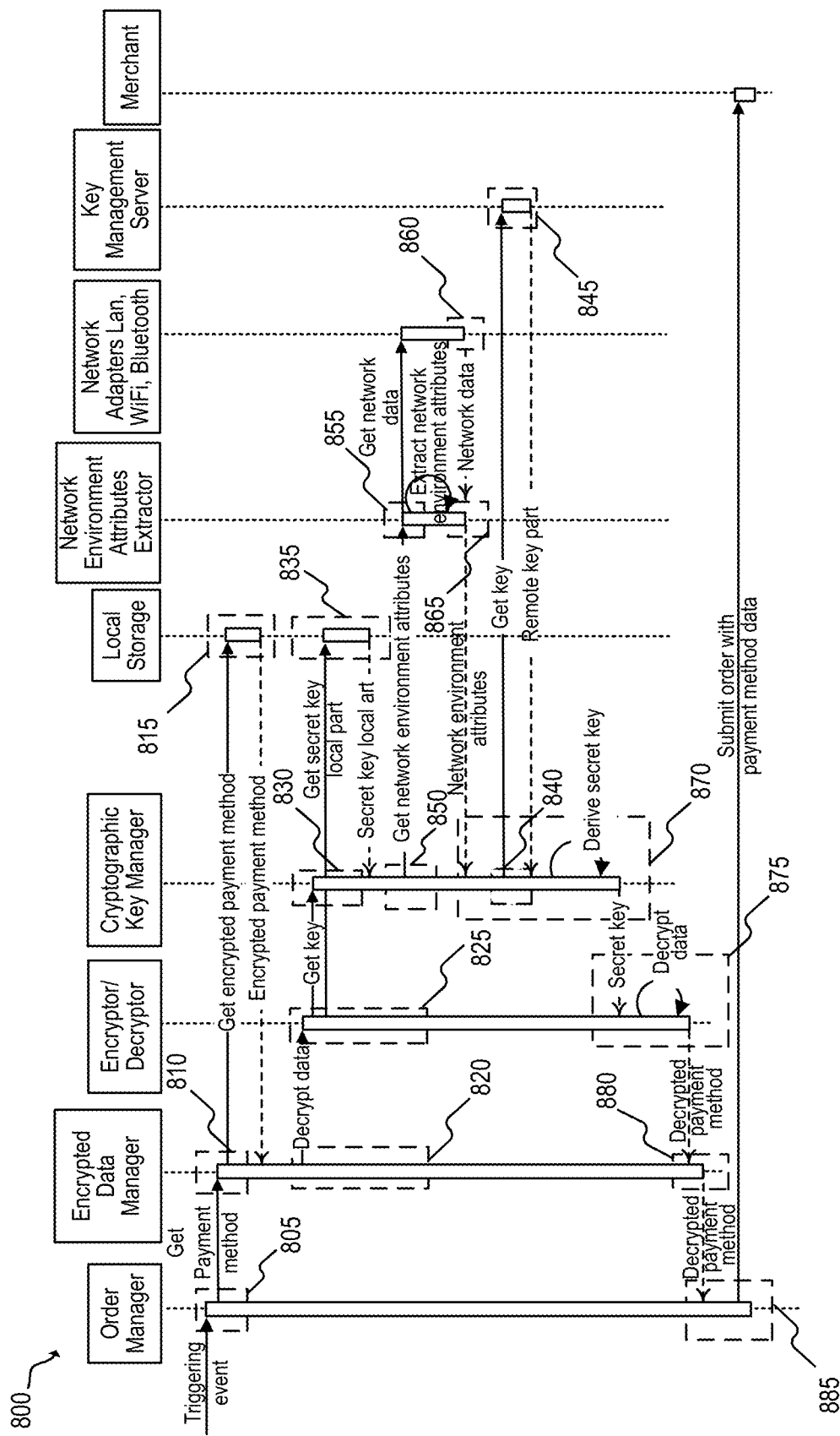
FIG. 8 is a sequence diagram that illustrates a process for performing a cardholder not present transaction, according to embodiments described herein.

FIG. 8 is a sequence diagram that illustrates a process 800 for performing a cardholder not present transaction, according to embodiments described herein. FIG. 8 is described with respect to the components of FIG. 6.

As illustrated in FIG. 8, a triggering event in the order manager 345 requests a payment method from the encrypted data manager 340 (at block 805). In response to receiving the payment method request from the order manager 345, the IoT device 105 checks the network environment (e.g., the local area network 130) for availability of minimally required network environment attributes.

When the minimally required network environment attributes are available, the encrypted data manager 340 of the IoT device 105 requests encrypted data that is an encrypted form of the payment method from the memory 220 (at block 810). The memory 220 outputs the encrypted data (e.g., the encrypted payment method) to the encrypted data manager 340 (at block 815). The encrypted data manager 340 decrypts the encrypted data with the encryptor/decryptor 335 (at block 820). Before decrypting the data, the encryptor/decryptor 335 requests a key for decrypting the encrypted data from the cryptographic key manager 605 (at block 825).

The cryptographic key manager 605 retrieves a secret key local part from the memory 220 when the cryptographic key manager 605 has previously split the secret key into the secret key local part and the secret key remote part (at block 830). The memory 220 outputs the secret key local part to the cryptographic key manager 605 (at block 835).

The cryptographic key manager 605 requests network environment attributes from the network environment attribute extractor 325 (at block 850). The network environment attribute extractor 325 requests network data from the network communications 210 (at block 855). The network communications 210 outputs network data to the network environment attribute extractor 325 (at block 860).

The network environment attribute extractor 325 receives network data from the network communications 210, determines network environment attributes subset from the network data, and outputs the network environment attributes subset to the cryptographic key manager 605 (at block 865). The cryptographic key manager 605 receives the network environment attributes subset from the network environment attribute extractor 325

The cryptographic key manager 605 retrieves a secret key remote part associated with the network environment attributes subset from the key management server 615 when the cryptographic key manager 605 has previously split the secret key into the secret key local part and the secret key remote part (at block 840). The key management server 615 outputs the secret key remote part to the cryptographic key manager 605 (at block 845).

The cryptographic key manager 605 combines the local and remote parts of the secret key and outputs the complete secret key to the encryptor/decryptor 335 (at block 870). Upon receiving the secret key, the encryptor/decryptor 335 decrypts the encrypted data to generate a decrypted payment method and outputs the decrypted payment method to the encrypted data manager 340 (at block 875). The encryptor/decryptor 335 erases the secret key immediately after completing the decryption process.

The encrypted data manager 340 outputs the decrypted payment method to the order manager 345 (at block 880). The encrypted data manager 340 erases the decrypted payment method immediately after completing the transmission process.

The order manager 345 receives the decrypted payment method and outputs an order to the merchant server 150 with the decrypted payment method (at block 885). The order manager 345 erases the decrypted payment method immediately after completing the order process.

When the minimally required network environment attributes are not available, the IoT device 105 prompts the user 305 with the output units 230 that an order cannot be placed with the IoT device 105. After prompting the user 305, the IoT device 105 aborts the order process.

Figure 9:
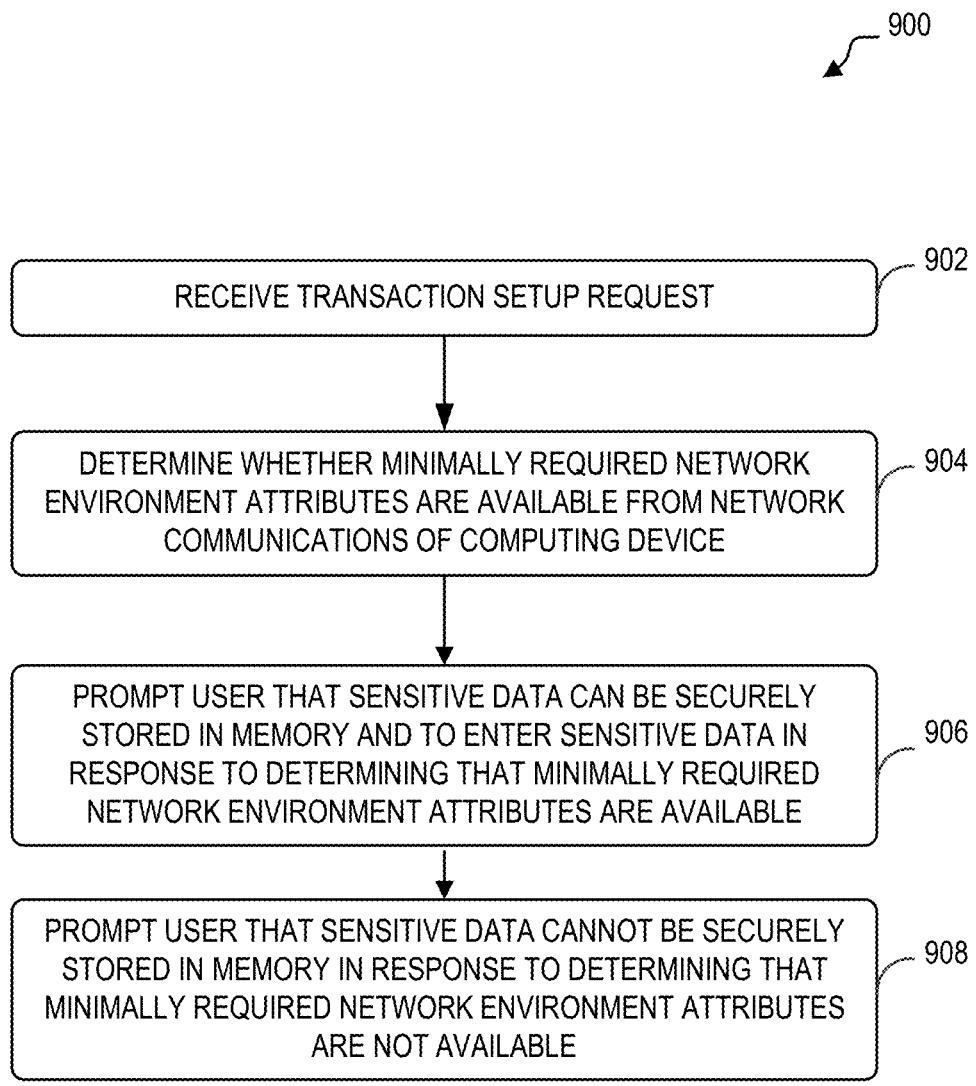
FIG. 9 is a flowchart that illustrates a method for performing data encryption in an IoT device, according to embodiments described herein.

FIG. 9 is a flowchart that illustrates a method 900 for performing data encryption in an IoT device, according to embodiments described herein. FIG. 9 is described with respect to FIG. 2.

The method 900 includes receiving, with an electronic processor of a computing device, a transaction setup request (at block 902). For example, the electronic processor 215 receives a transaction setup request.

The method 900 includes determining, with the electronic processor, whether minimally required network environment attributes are available from network communications of the computing device (at block 904). For example, the electronic processor 215 determines whether minimally required network environment attributes are available from the network communications 210 of the IoT device 105.

The method 900 includes prompting, with the electronic processor, a user that sensitive data can be securely stored in a memory and to enter the sensitive data in response to determining that the minimally required network environment attributes are available (at block 906). For example, the electronic processor 215 prompts, with the output units 230, a user that sensitive data can be securely stored in the memory 220 and to enter the sensitive data in response to determining that the minimally required network environment attributes are available.

The method 900 includes prompting, with the electronic processor, the user that the sensitive data cannot be securely stored in the memory in response to determining that the minimally required network environment attributes are not available (at block 908). For example, the electronic processor 215 prompts, with the output units 230, the user that the sensitive data cannot be securely stored in the memory 220 in response to determining that the minimally required network environment attributes are not available.

In some examples, the method 900 may further include detecting a trigger event for an order from a merchant, retrieving encrypted sensitive data from the memory in response to detecting the trigger event, decrypting the encrypted sensitive data with a secret key derived from network environment attributes, extracting a payment method from the encrypted sensitive data that is decrypted, and transmitting the order with the payment method to a server of the merchant.

In some examples, the method 900 may further include receiving the sensitive data, encrypting the sensitive data with a secret key derived from network environment attributes, and controlling the memory to store the sensitive data that is encrypted. In these examples, encrypting the sensitive data with the secret key derived from the network environment attributes may further include requesting network data from the network communications in response to receiving the sensitive data, extracting network environment attributes from the network data, generating the secret key based on the network environment attributes, and encrypting the sensitive data with the secret key. Additionally, in these examples, the method 900 may further include splitting the secret key into a secret key local part and a secret key remote part, controlling the memory to store the secret key local part, and controlling a key management server to store the secret key remote part. Further, in some examples, controlling the key management server to store the secret key remote part further includes encrypting the secret key remote part, and controlling the key management server to store the secret key remote part that is encrypted.

It is to be understood that the embodiments are not limited in its application to the details of the configuration and arrangement of components set forth herein or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more electronic processors, one or more computer-readable medium modules, one or more input/output interfaces, and various connections (e.g., a system bus) connecting the various components.

Thus, embodiments described herein provide, among other things, protecting sensitive data in internet-of-things (IoT) device. Various features and advantages are set forth in the following claims.

What is claimed is:
1. A computing device comprising:
   network communications configured to communicate network data of a network environment;
   a memory; and
   an electronic processor communicatively coupled to the memory and the network communications, the electronic processor is configured to
   receive the network data from the network communications, receive a transaction setup request, wherein the transaction setup includes setting up access to sensitive data stored in a memory, responsive to receiving the network data and the transaction setup request, detect a number of available network environment attributes from the network data, determine an encryption threshold according to a cryptographic algorithm that will be used in encrypting the sensitive data and a required encryption strength, determine whether the number of available network environment attributes is equal to or greater than the encryption threshold, responsive to determining that the number is not equal to or greater than the encryption threshold, prompt a user that the sensitive data cannot be securely stored in the memory, and responsive to determining that the number is equal to or greater than the encryption threshold, perform encryption operations including:
  prompt the user that the sensitive data can be securely stored in the memory and to enter the sensitive data,
  receive the sensitive data from the user,
  generate a secret key based on a portion of the available network environment attributes that are detected, wherein the portion is a second number of available network environment attributes that is equal to or greater than the encryption threshold,
  encrypt the sensitive data with the secret key, and
  store the encrypted sensitive data in the memory.

2. The computing device of claim 1, wherein the electronic processor is further configured to decrypt the encrypted sensitive data with the secret key.

3. The computing device of claim 1, wherein the electronic processor is configured to
  receive a payment method request,
  retrieve the encrypted sensitive data from the memory,
  decrypt the encrypted sensitive data, and
  output a payment method from the sensitive data that is decrypted.

4. The computing device of claim 3, wherein the electronic processor is further configured to
  detect a trigger event for an order from a merchant, and
  transmit the order with the payment method to a server of the merchant.

5. The computing device of claim 1, wherein the electronic processor is further configured to
  responsive to receiving the sensitive data, request the secret key,
  receive the secret key, and
  output the encrypted sensitive data.

6. The computing device of claim 1, wherein the electronic processor is further configured to
  split the secret key into a secret key local part and a secret key remote part,
  control the memory to store the secret key local part, and
  control a key management server to store the secret key remote part or the secret key.

7. The computing device of claim 6, wherein, to control the key management server to store the secret key remote part or the secret key, the electronic processor is further configured to
  encrypt the secret key remote part or the secret key, and
  control the key management server to store the secret key remote part that is encrypted or the secret key that is encrypted.

8. The computing device of claim 1, wherein the network communications includes a local area network (LAN)/Ethernet adapter, a Wi-Fi adapter, a Bluetooth® adapter, or a combination thereof.

9. The computing device of claim 8, wherein the network environment attributes includes device attributes, and wherein the device attributes includes a device name attribute, a model attribute, a brand attribute, a family attribute, or a combination thereof, and wherein one of the device attributes is associated with a device that is separate and distinct from the computing device.

10. The computing device of claim 8, wherein the network environment attributes includes LAN attributes associated with the LAN/Ethernet adapter, and wherein the LAN attributes includes netmask attribute, gateway attribute, domain name service (DNS) attribute, or a combination thereof.

11. The computing device of claim 8, wherein the network environment attributes includes Wi-Fi attributes associated with the Wi-Fi adapter, and wherein the Wi-Fi attributes includes internet service provider (ISP) name attribute, a public internet protocol (IP) address attribute, a location attribute, a time zone attribute, or a combination thereof.

12. The computing device of claim 8, wherein the network environment attributes includes Wi-Fi access point attributes, and wherein the Wi-Fi access point attributes includes a service set identifier (SSID) attribute, a basic service set identifier (BSSID) attribute, a mode attribute, a channel attribute, a rate attribute, a supported security protocols attribute, or a combination thereof.

13. The computing device of claim 1, wherein the encryption threshold is a positive integer that is equal to or greater than sixteen.

14. A method comprising:
  receiving, by an electronic processor of a computing device, network data from network communications of the computing device;
  receiving, by the electronic processor r, a transaction setup request, wherein the transaction setup includes setting up access to sensitive data stored in a memory;
  responsive to receiving the network data and the transaction setup request, detecting a number of available network environment attributes from the network data;
  determining, by the electronic processor, an encryption threshold according to a cryptographic algorithm that will be used in encrypting the sensitive data and a required encryption strength;
  determining, by the electronic processor, whether the number of available network environment attributes is equal to or greater than the encryption threshold;
  based on the determination whether the number of available network environment attributes is equal to or greater than the encryption threshold:
  prompting, by the electronic processor, a user that the sensitive data can be securely stored in the memory and to enter the sensitive data,
  receiving, by the electronic processor, the sensitive data,
  generating, by the electronic processor, a secret key based on a portion of the available network environment attributes that are detected, wherein the portion is a second number of available network environment attributes that is equal to or greater than the encryption threshold,
  encrypting, by the electronic processor, the sensitive data with the secret key, and
  storing, by the electronic processor, the memory to store the encrypted sensitive data in the memory.

15. The method of claim 14, further comprising:
detecting a trigger event for an order from a merchant;
responsive to detecting the trigger event, retrieving the encrypted sensitive data from the memory;
decrypting the encrypted sensitive data with the secret key;
extracting a payment method from the encrypted sensitive data that is decrypted; and
transmitting the order with the payment method to a server of the merchant.

16. The method of claim 14, further comprising:
splitting the secret key into a secret key local part and a secret key remote part;
controlling the memory to store the secret key local part; and
controlling a key management server to store the secret key remote part.

17. The method of claim 16, wherein controlling the key management server to store the secret key remote part further includes
encrypting the secret key remote part; and
controlling the key management server to store the secret key remote part that is encrypted.

18. A non-transitory computer-readable medium comprising instructions that, when executed by an electronic processor, cause the electronic processor to perform a set of operations comprising:
receiving network data from network communications;
receiving a transaction setup request, wherein the transaction setup includes setting up access to sensitive data stored in a memory;
responsive to receiving the network data and the transaction setup request, detecting a number of available network environment attributes from the network data;
determining an encryption threshold according to a cryptographic algorithm that will be used in encrypting the sensitive data and a required encryption strength;
determining whether the number of available network environment attributes is equal to or greater than the encryption threshold;
based on the determination whether the number of available network environment attributes is equal to or greater than the encryption threshold, performing steps of:
prompting a user that sensitive data can be securely stored in the memory and to enter the sensitive data;
receiving the sensitive data;
generating a secret key based on a portion of the available network environment attributes that are detected, wherein the portion is a second number of available network environment attributes that is equal to or greater than the encryption threshold;
encrypting the sensitive data with the secret key; and
storing the encrypted sensitive data in the memory.

19. The non-transitory computer-readable medium of claim 18, wherein the set of operations further includes
detecting a trigger event for an order from a merchant;
retrieving the encrypted sensitive data from the memory in response to detecting the trigger event;
decrypting the encrypted sensitive data with the secret key;
extracting a payment method from the encrypted sensitive data that is decrypted; and
transmitting the order with the payment method to a server of the merchant.

20. The non-transitory computer-readable medium of claim 18, wherein the set of operations further includes
splitting the secret key into a secret key local part and a secret key remote part;
controlling the memory to store the secret key local part; and
controlling a key management server to store the secret key remote part.

* * * * *